United States Patent Office 3,354,156
Patented Nov. 21, 1967

3,354,156
N,N'-DISUBSTITUTED DITHIOOXAMIDES AND PROCESS FOR THEIR PREPARATION
Gerhard R. Wendt, Havertown, and Elizabeth Hertz, Bryn Mawr, Pa., assignors to American Home Products Corporation, New York, N.Y., a corporation of Delaware
No Drawing. Filed Dec. 6, 1966, Ser. No. 599,405
15 Claims. (Cl. 260—246)

ABSTRACT OF THE DISCLOSURE

The compounds of the class of N,N'-di(monocyclic heterocyclic) dithiooxamides, useful as amebicides.

This is a continuation-in-part of the copending application Ser. No. 311,950 filed Sept. 27, 1963, now abandoned.

This invention is concerned with novel N,N'-disubstituted dithiooxamides, and to a method for making the same.

More particularly, this invention is concerned with those N,N'-disubstituted dithiooxamides which are represented by the following general formula:

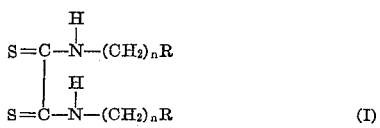

and the pharmaceutically acceptable acid-addition salts thereof, wherein $n$ is 2 to 4; R is a substituted or unsubstituted monocyclic heterocyclic group such as pyrrolidino, morpholino, piperazino, pyridyl, piperidino, 4-(halophenylcarbamoyl) piperazino, 4-(nitrophenylcarbamoyl) piperazino, and the like. In the case of the two last-named substitutents, it will be understood that the halogen (chlorine, fluorine, bromine or iodine) and the nitro group may be attached to either the o-, the m- or the p-position. For the purpose of this invention, the various halogens are equivalent.

Among the suitable acid-addition salts include, inter alia, inorganic acids, such as the hydrohalide acids (e.g., hydrochloric and hydrobromic acid), sulphuric acid, nitric acid and phosphoric acid, and organic acids such as fumaric, tartaric, citric, acetic, succinic and maleic acid.

The novel compounds of this invention are pharmacologically active substances which are useful as amebicides. Hence, the compounds may be used for such purposes in lieu of Emetine in the treatment of warm-blooded animals.

The compounds of this invention are prepared by reacting dithiooxamide and a primary amine in an organic solvent such as a lower alkanol. The reaction shown below as Reaction A is preferably carried out at the reflux temperature of the reaction mixture for a period ranging from about 4 to about 8 hours.

Following this period of heating, the reaction mixture is cooled for several hours. At this point the procedure may be varied as desired to induce precipitation of the product. That is to say, the cooled reaction mixture may be poured into ice water or maintained at around 4–6° for over 10 hours. Alternatively, the crude product may be obtained by adding petroleum ether to the chilled reaction mass.

To obtain those compounds of Formula I where R is a substituted heterocyclic group, such as 4-(halophenylcarbamoyl) piperazino and 4-(nitrophenylcarbamoyl) piperazino, the unsubstituted compound, such as when R is piperazino, is further reacted in chloroform with an isocyanate compound such as a halophenyl isocyanate or a nitrophenyl isocyanate (as shown in Reaction B) at room temperature or slightly above.

The above outlined reactions are schematically illustrated below:

REACTION A

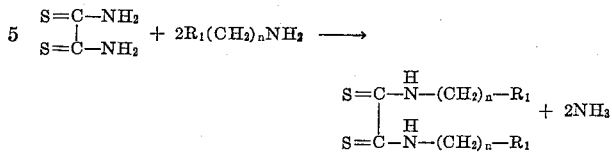

REACTION B

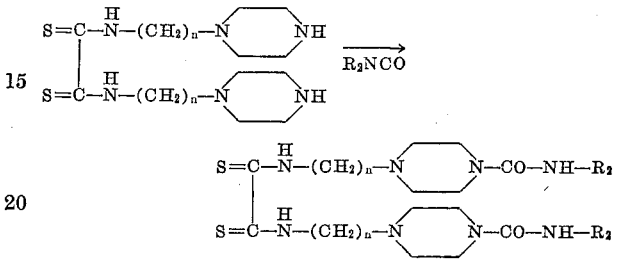

where $R_1$ is an unsubstituted monocyclic heterocyclic group, $R_2$ is a halophenyl or nitrophenyl group and $n$ is as hereinbefore defined.

The following examples serve to illustrate but are not intended to limit the invention.

*Example 1.—N,N'-bis(2-pyrrolidinoethyl) dithiooxamide*

A mixture of 24.0 g. of dithiooxamide, 45.7 g. of 2-pyrrolidinoethylamine and 240 ml. of ethanol was refluxed for 4 hours. After cooling, the reaction mixture was poured into cold water. The precipitate was filtered off, washed with water and dried. The crude product was dissolved in petroleum ether, treated with charcoal and filtered. On cooling there was obtained 29 g. (46%) of the product as orange plates, M.P. 93–94°.

Found: C, 53.36; H, 8.22; N, 17.67; S, 20.11. $C_{14}H_{26}N_4S_2$ requires: C, 53.46; H, 8.33; N, 17.82; S, 20.39.

*Example 2.—N,N'-bis(2-pyrrolidinoethyl) dithiooxamide dimaleate*

A solution of 1.74 g. of maleic acid in 40 ml. of acetone was added to a solution of 4.72 g. of N,N'-bis(2-pyrrolidinoethyl) dithiooxamide, in 30 ml. of acetone. After standing for 30 minutes at room temperature, the solid precipitate was filtered off, washed with acetone and dried. Recrystallization from acetonitrile afforded 3.34 g. (51.6%) of the product, M.P. 171.5–172.5°.

Found: C, 48.48; H, 6.32; N, 10.29; S, 11.46. $C_{22}H_{34}N_4O_8S_2$ requires: C, 48.33; H, 6.27; N, 10.25; S, 11.73%.

*Example 3.—N,N'-bis(2-morpholinoethyl) dithiooxamide*

A mixture of 24.0 g. of dithiooxamide, 52.1 g. of 2-morpholinoethylamine and 240 ml. of ethanol was refluxed for 4 hours and then kept for 20 hours between 4–6° C. The precipitate was filtered off, washed with cold water and dried. A solution of the material in benzene was poured onto a column of grade 1 alumina (Brockman). Elution with 20:80 ethyl acetate-benzene, followed by recrystallization from ethyl acetate gave 44.1 g. (63.8%) of the product, M.P. 140–142°.

Found: C, 48.57; H, 7.53; N, 15.94; S, 18.18. C, H, N, O, S requires: C, 48.52; H, 7.57; N, 16.17; S, 18.51%.

*Example 4.—N,N'-bis[2-(2-pyridyl)ethyl] dithiooxamide*

A mixture of 19.1 g. of dithiooxamide, 39.2 g. of 2-(2-aminoethyl) pyridine and 180 ml. of ethanol was refluxed for 7.5 hours and then kept overnight between 4–6° C. The black precipitate was filtered off, washed with water and dried. A solution of the material in methylene chloride was passed through a chromatographic column containing grade 1 neutral alumina. The column was washed with more methylene chloride. The residue left on evaporation of the solvent was recrystallized from ethyl acetate to give 26.6 g. (50%) of the product as orange crystals, M.P. 157.5–159°.

Found: C, 57.95; H, 5.40; S, 19.52. $C_{16}H_{18}N_4S_2$ requires: C, 58.15; H, 5.49; S, 19.41%.

*Example 5.—N,N'bis[2-(2-pyridyl)ethyl] dithiooxamide dihydrochloride*

Anhydrous hydrogen chloride was bubbled into a solution of 3.3 g. of N,N'-bis[2-(2-pyridyl)ethyl]dithiooxamide prepared above in 220 ml. of methylene chloride causing precipitation of the crude dihydrochloride. After standing for 15 minutes the precipitate was collected, washed with methylene chloride and dried. Recrystallization once from acetonitrile, and once from ethanol gave 2.1 g. (52%) of the product, M.P. 215–218°.

Found: C, 47.39; H, 4.70; Cl, 17.60; S, 15.82.

$C_{16}H_{20}Cl_2N_4S_2$ requires: C, 47.64; H, 5.00; Cl, 17.58; S, 15.90%.

*Example 6.—N,N'-bis(2-piperazinoethyl)dithiooxamide*

A mixture of 36.1 g. of dithiooxamide, 77.5 g. of 2-piperazinoethylamine and 360 ml. of ethanol was refluxed for 4 hours. The reaction mixture was chilled and petroleum ether added. The precipitate was filtered off and washed with petroleum ether. The crude product was then dissolved in chloroform and reprecipitated by adding petroleum ether. The material was dissolved in boiling isopropanol, and the solution treated with Darco G-60, filtered, and chilled to give 51.0 g. (49.5%) of the product, M.P. 165.5–168.5°.

Found: C, 48.64; S, 8.07; N, 24.28; S, 18.27. $C_{14}H_{28}N_6S_2$ requires: C, 48.80; H, 8.19; N, 24.39; S, 18.61%.

*Example 7.—N,N'-bis(2-[4-(m-chlorophenylcarbamoyl) piperazino]ethyl)dithiooxamide*

To 3.45 g. of N,N'-bis(2-piperazinoethyl)dithiooxamide in 35 ml. of chloroform was added a solution of 3.07 g. of m-chlorophenyl isocyanate in 40 ml. of chloroform. After standing at room temperature overnight, the resulting precipitate was filtered off, washed with chloroform and dried. It was recrystallized from dimethylformamide-water, using Darco G-60, to afford 5.40 g. (83%) of the product, M.P. 211–212° (dec.).

Found: C, 51.74; H, 5.56; Cl, 10.76; N, 17.38.

$C_{28}H_{36}Cl_2N_8O_2S_2$ requires: C, 51.70; H, 5.57; Cl, 10.89; N, 17.19%.

*Example 8.—N,N'bis(2-[4-(m-nitrophenylcarbamoyl) piperazino]ethyl)dithiooxamide*

To 10.3 g. of N,N'-bis(2-piperazinoethyl)dithiooxamide in 100 ml. of warm chloroform was added a solution of 9.9 g. of m-nitrophenyl isocyanate in 150 ml. of chloroform over a period of 10 minutes with agitating. The mixture was shaken at room temperature overnight. The solid was filtered off, washed with chloroform and dried. The crude product was recrystallized from dimethylformamide-water to give 14.6 g. (72.2%), M.P. 217.5–219° (dec.).

Found: C, 50.18; H, 5.67; S, 9.57. $C_{28}H_{36}N_{10}O_6S_2$ requires: C, 50.00; H, 5.38; S, 9.51%.

*Example 9.—N,N'-bis(3-pyrrolidinopropyl)dithiooxamide*

A mixture of 23.7 g. of dithiooxamide, 50.6 g. of 3-pyrrolidinopropylamine and 240 ml. of ethanol was refluxed for 5 hours, and then stored between 4–6° overnight. A dark solid was filtered off, washed with water and dried. Addition of water to the alcoholic filtrate gave a second crop of crude product. The two solids were dissolved in ethyl acetate and passed through a chromatographic column containing neutral alumina (grade 1). The column was washed with more ethyl acetate until the dark zone moved to the bottom. Evaporation of the solvent gave 42.7 g. (63.5%) of the product, M.P. 84–86°.

Found: C, 56.00; H, 8.81; N, 16.05; S, 18.67.

$C_{16}H_{30}N_4S_2$ requires: C, 56.10; H, 8.83; N, 16.36; S, 18.72%.

*Example 10.—N,N'bis(3-morpholinopropyl) dithiooxamide*

A mixture of 18.0 g. of dithiooxamide, 43.3 g. of 3-morpholinopropylamine and 180 ml. of ethanol was refluxed for 7 hours, then kept between 4–6° overnight. A dark solid was filtered off, washed with water and dried. A solution of the material in benzene was passed through a column of neutral alumina (grade 1) and the column washed sufficiently with benzene to elute the product. Removal of benzene by warming in vacuo furnished 31.8 g. (56.6%) of the product as orange plates, M.P. 117.5–119°.

Found: C, 51.49; H, 8.08; N, 15.02; S, 17.01.

$C_{16}H_{30}N_4O_2S_2$ requires: C, 51.30; H, 8.07; N, 14.9; S, 17.21%.

*Example 11.—N,N'bis(4-pyrrolidinobutyl)dithiooxamide*

A mixture of 21.1 g. of dithiooxamide, 50.2 g. of 4-pyrrolidinobutylamine and 240 ml. of ethanol was refluxed for 7 hours. The reaction mixture was chilled, poured into cold water and kept between 4–6° overnight. The precipitate was filtered off, washed thoroughly with cold water and dried. A solution of the material in ethyl acetate was passed through a column of neutral alumina (grade 1), the column being washed with more ethyl acetate. Evaporation of the solvent gave a red oil. Since the material failed to crystallize, it was chromatographed again. Elution of the column with ether furnished a viscous red oil which after crystallization from hexane yielded 23.9 g. (37%) of the product as orange needles, M.P. 56–57.5°.

Found: C, 58.16; H, 8.93; N, 14.89; S, 17.46.

$C_{18}H_{34}N_4S_2$ requires: C, 58.33; H, 9.25; N, 15.12; S, 17.30%.

*Example 12.—N,N'-bis(4-pyrrolidinobutyl)dithiooxamide dimaleate*

Addition of 3.5 g. of maleic acid in 400 ml. of ether to a solution of 5.8 g. of N,N'-bis(4-pyrrolidinobutyl)dithiooxamide in 100 ml. of ether produced a viscous oil which solidified on standing in the cold room. Recrystallization from isopropanol furnished 8.1 g. (89%) of the product, M.P. 114.5–115°.

Found: C, 52.08; H, 6.92; S, 10.48. $C_{26}H_{42}N_4O_8S_2$ requires: C, 51.81; H, 7.02; S, 10.64%.

Similarly, following the procedure of Example 12, but substituting another organic acid or inorganic acid for maleic acid, the corresponding acid-addition salt is formed.

*Example 13.—N,N'-bis(2-piperidinoethyl)dithiooxamide*

A mixture of 24.0 g. dithiooxamide, 51.3 g. 2-piperidinoethylamine and 240 ml. ethanol is refluxed for 4 hours, then kept between 4–6° C. overnight. The precipitate is filtered off, washed, dried and purified by chromatography on grade 1 alumina.

The compounds of this invention can be administered to warm-blooded animals with pharmaceutically acceptable inert carriers in a wide variety of oral or parenteral unit dosage forms containing 25, 100, 250 or 500 mg. of active ingredients for the symptomatic adjustment of the dosage to the individual patient, or in admixture with other active compounds.

The present invention also includes the process of bringing the compounds thereof into a form suitable for therapeutic administration by associating them with liquid or solid, pharmaceutically acceptable carriers or animal feeds.

What is claimed is:

1. A compound selected from the group consisting of those of the formula

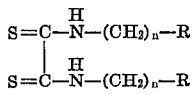

and the pharmaceutically acceptable acid-addition salts thereof, wherein $n$ is an integer ranging from 2 to 4, inclusive, and R is selected from the group consisting of pyrrolidino, morpholino, piperazino, pyridyl, piperidino, 4-(halophenylcarbamoyl)piperazino and 4-(nitrophenylcarbamoyl)piperazino.

2. A compound according to claim 1 that is N,N'-bis(2-pyrrolidinoethyl) dithiooxamide.

3. A compound according to claim 1 that is N,N'-bis(2-pyrrolidinoethyl) dithiooxamide dimaleate.

4. A compound according to claim 1 that is N,N'-bis(2-morpholinoethyl) dithiooxamide.

5. A compound according to claim 1 that is N,N'-bis[2-(2-pyridyl)ethyl] diothiooxamide.

6. A compound according to claim 1 that is N,N'-bis[2-(2-pyridyl)ethyl] dithiooxamide dihydrochloride.

7. A compound according to claim 1 that is N,N'-bis(2-piperazinoethyl) dithiooxamide.

8. A compound according to claim 1 that is N,N'-bis(2-[4-(halophenylcarbamoyl)-piperazino] ethyl) dithiooxamide.

9. A compound according to claim 8 that is N,N'-bis(2-[4-(m-chlorophenylcarbamoyl)-piperazino] ethyl) dithiooxamide.

10. A compound according to claim 1 that is N,N'-bis(2 - [4-(m-nitrophenylcarbamoyl)-piperazino]ethyl)dithiooxamide.

11. A compound according to claim 1 that is N,N'-bis(3-pyrrolidinopropyl)dithiooxamide.

12. A compound according to claim 1 that is N,N'-bis(3-morpholinopropyl)dithiooxamide.

13. A compound according to claim 1 that is N,N'-bis(4-pyrrolidinobutyl)dithiooxamide.

14. A compound according to claim 1 that is N,N'-bis(4-pyrrolidinobutyl)dithiooxamide dimaleate.

15. A process for preparing a compound according to claim 1 having the formula

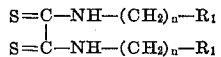

wherein $n$ is an integer from 2 to 4 and $R_1$ is a monocyclic heterocyclic group, which comprises reacting dithiooxamide and an amine of the formula

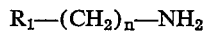

wherein $n$ and $R_1$ are as hereinbefore defined, in an organic solvent at the reflux temperature of the mixture.

References Cited

Hurd, Richard N. et al., J. Org. Chem., vol. 26, pp. 3980–87 (1961).

Phillips, J.A.C.S., vol. 73, pp. 5822–4 (1951).

Phillips, J.A.C.S., vol. 74, pp. 4320–21 (1952).

ALEX MAZEL, *Primary Examiner.*

J. TOVAR, *Assistant Examiner.*